(12) United States Patent
Takagi

(10) Patent No.: US 7,558,011 B2
(45) Date of Patent: Jul. 7, 2009

(54) VIDEO RECORDER TO BE CONNECTED TO A DIGITAL VIDEO CAMCORDER VIA IEEE 1394 SERIAL BUS

(75) Inventor: Atsushi Takagi, Daito (JP)

(73) Assignee: Funai Electric Co., Ltd., Daito-shi (JP)

( * ) Notice: Subject to any disclaimer, the term of this patent is extended or adjusted under 35 U.S.C. 154(b) by 831 days.

(21) Appl. No.: 11/259,034

(22) Filed: Oct. 27, 2005

(65) Prior Publication Data

US 2006/0088283 A1 Apr. 27, 2006

(30) Foreign Application Priority Data

Oct. 27, 2004 (JP) ............................. 2004-312124

(51) Int. Cl.
*G11B 5/86* (2006.01)
*H04N 5/00* (2006.01)
(52) U.S. Cl. ............................. 360/15; 386/46; 386/125
(58) Field of Classification Search .................. 386/46, 386/52, 66, 68, 117, 124–126; 360/15
See application file for complete search history.

(56) References Cited

U.S. PATENT DOCUMENTS

2001/0031131 A1* 10/2001 Fukai et al. .................... 386/52
2002/0008927 A1* 1/2002 Park et al. ..................... 360/15
2005/0034154 A1* 2/2005 Yeh et al. ...................... 725/38

FOREIGN PATENT DOCUMENTS

| JP | 08-009320 | 1/1996 |
| JP | 2000-59731 A | 2/2000 |
| JP | 2000-353349 | 12/2000 |
| JP | 2004-120228 A | 4/2004 |

OTHER PUBLICATIONS

Japanese Office Action dated May 9, 2007 w/ English Translation (Three (3) pages).

* cited by examiner

*Primary Examiner*—Thai Tran
*Assistant Examiner*—Mishawn Dunn
(74) *Attorney, Agent, or Firm*—Crowell & Moring LLP

(57) ABSTRACT

A video recorder connected to a DV camcorder comprises: a microprocessor; a program data file for storing time codes in stream data on a DV tape corresponding to dubbing start and end positions ("start and end time codes") when a user commands the start and end positions after commanding the camcorder to reproduce the stream data; and a log table for storing the start and end time codes as well as a reset time code and a time code immediately preceding the reset time code. When the same time code as the end time code is acquired while reproducing data area from the start time code to the end time code, the microprocessor determines, based on the time codes in the log table, whether the then reproduction position is the same as the commanded dubbing end position. This enables secure dubbing even with stream data containing reset time codes.

8 Claims, 11 Drawing Sheets

PROGRAM DATA FILE 9

| SCENE NO. | TIME CODE OF DUBBING START POSITION | TIME CODE OF DUBBING END POSITION |
|---|---|---|
| (1) | 0:05 | 0:06 |
|  |  |  |
|  |  |  |

LOG TABLE 8

| TIME CODE OF DUBBING START POSITION | TIME CODE OF DUBBING END POSITION |
|---|---|
| 0:05 | 0:15 |
| 0:00 | 0:06 |

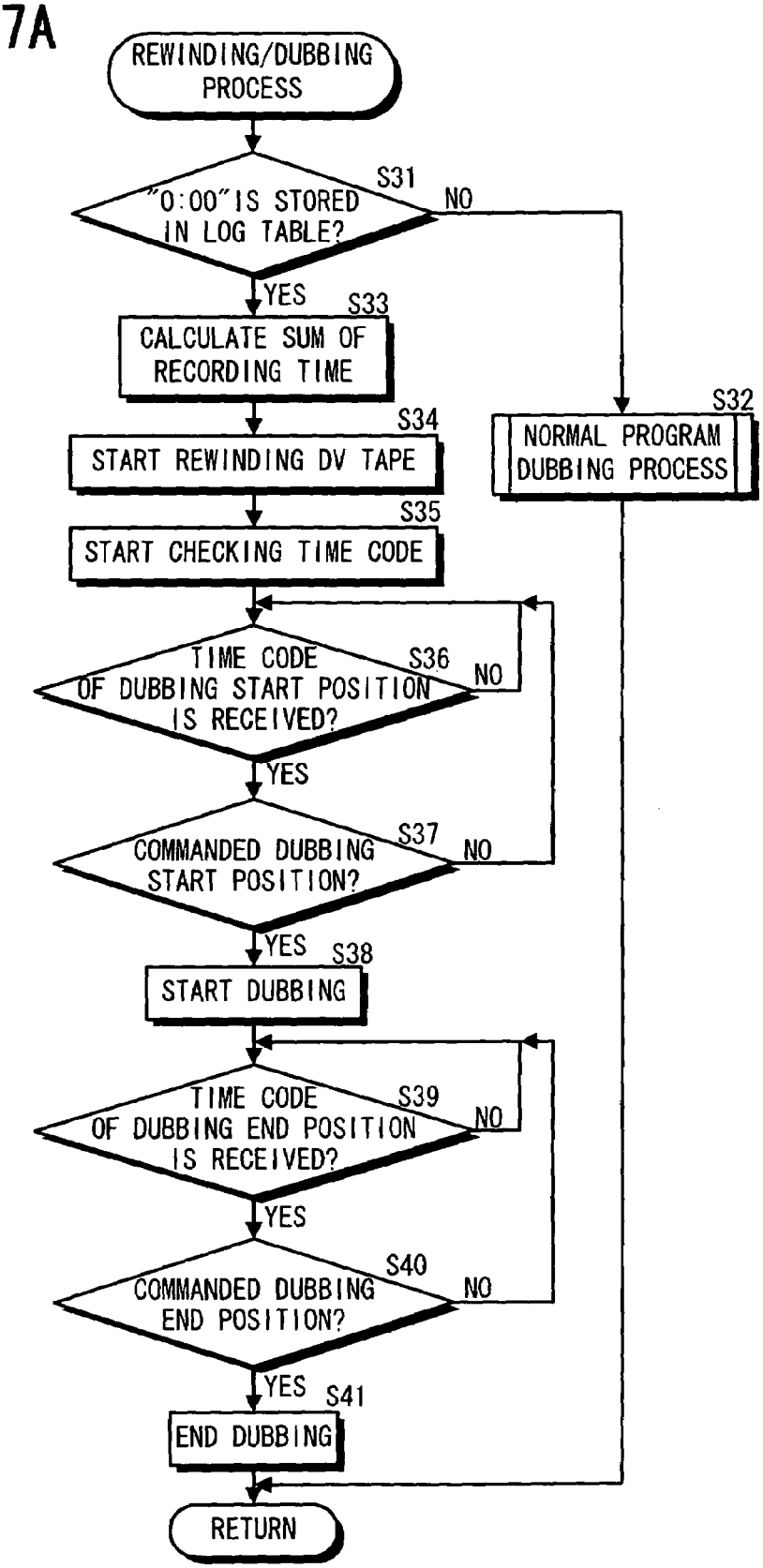

VIDEO RECORDER TO BE CONNECTED TO A DIGITAL VIDEO CAMCORDER VIA IEEE 1394 SERIAL BUS

BACKGROUND OF THE INVENTION

1. Field of the Invention

The present invention relates to a video recorder, such as an HDD (Hard Disk Drive) recorder, a DVD (Digital Versatile Disc) recorder or a digital VCR (Video Cassette Recorder), which is to be connected to a DV (Digital Video) camcorder via an IEEE (Institute of Electrical & Electronics Engineers) 1394 serial bus, and which is capable of recording stream data sent from the DV camcorder.

2. Description of the Related Art

A dubbing method called program dubbing is known to dub (record) stream data reproduced from a DV tape of a DV camcorder onto a recording medium of a video recorder, such as an HDD recorder, which is connected to the DV camcorder via an IEEE 1394 serial bus. According to the program dubbing, a user first commands the DV camcorder from the video recorder to perform normal reproduction or fast-forward reproduction, and searches contents in the stream data in the DV tape. When the user commands a dubbing start position and a dubbing end position in the DV tape while searching the contents in the stream data, a microprocessor of the video recorder stores time codes in the data, which respectively correspond to the commanded dubbing start position and the commanded dubbing end position, as program data in a memory in the video recorder (such time codes being hereafter referred to as "start time code" and "end time code", respectively). Based on the program data, the microprocessor controls the DV camcorder so as to automatically dub, onto the recording medium of the video recorder, the stream data recorded on the DV tape in a data area from a position corresponding to the dubbing start position to a position corresponding to the dubbing end position.

However, a conventional video recorder having a program dubbing capability simply compares time codes contained in the stream data sent from a DV camcorder with the start time code and the end time code contained in the program data, so as to determine the dubbing start position and the dubbing end position in the DV tape. This simple comparison of time codes causes a problem in the following cases where the recording mode is changed, for example, from SP (Standard Play) mode to LP (Long Play) mode when the DV camcorder is recording (photographing) on one DV tape, where the DV camcorder is subjected to image fade-in/fade-out process when the DV camcorder is recording on one DV tape, and where the DV tape is once taken out of the DV camcorder.

In these cases, the time code in the DV tape is automatically reset to "0:00" (0 or zero reset). This causes multiple stream data containing the same time code to be recorded on the DV tape. Thus, the simple comparison of time codes to simply compare the time codes contained in the stream data sent from a DV camcorder with the start time code and the end time code contained in the program data may make it impossible to accurately determine the dubbing start position and the dubbing end position in the DV tape. This will be described more specifically below with reference to FIG. 13, which is a chart showing an exemplary combination of the commanded dubbing start position, 0 reset position and commanded dubbing end position in the DV tape set in the DV camcorder according to the prior art.

For example, assuming that the commanded dubbing start position and the commanded dubbing end position, as commanded by a user, are those positions as schematically shown in FIG. 13, the microprocessor of the video recorder attempts to rewind the DV tape from the commanded dubbing end position to the commanded dubbing start position. However, the DV tape schematically shown in FIG. 13 is once reset to 0 (zero), so that in addition to the data corresponding to the commanded dubbing start position, the DV tape has separate data (data corresponding to the position P104 in FIG. 13) containing the same time code (0:05) as the time code (0:05) contained in the data corresponding to the commanded dubbing start position.

Accordingly, the microprocessor of the video recorder may mis-identify the position P104 as the commanded dubbing start position and may rewind the DV tape only up to the position P104. Thus, even though the user has wished for the video recorder to record the data in areas A and B in the DV tape, the video recorder may record the data in area D in the DV tape (area from the position P104 to the commanded dubbing end position). Furthermore, if the user attempts to set the commanded dubbing end position to the position P104 (the second position of time code 0:05) while maintaining the commanded dubbing start position at the same position as above (the first position of time code 0:05) in the DV tape shown in FIG. 13, the time code corresponding to the commanded dubbing start position becomes the same time code (0:05) as that corresponding to the commanded dubbing end position. Accordingly, the microprocessor of the video recorder may often reject such input.

SUMMARY OF THE INVENTION

An object of the present invention is to provide such a video recorder to be connected to a DV camcorder via an IEEE 1394 serial bus that can securely dub, onto a recording medium of the video recorder, stream data recorded on a DV tape of the DV camcorder in an area from a commanded dubbing start position to a commanded dubbing end position, even in the case of program dubbing onto the recording medium of the video recorder from a DV tape with a time code(s) being reset.

According to the present invention, we provide a video recorder to be connected to a DV (Digital Video) camcorder via an IEEE (Institute of Electrical & Electronics Engineers) 1394 serial bus, the video recorder comprising: an operation means for commanding and operating the DV camcorder and the video recorder itself; an IEEE 1394 interface for sending and receiving control commands and its response signal, and also sending and receiving stream data, to and from the DV camcorder; a video recording means for recording, on a recording medium, stream data received from the DV camcorder via the IEEE 1394 interface; a time code acquisition means for acquiring a time code contained in data which is in stream data recorded on a DV tape of the DV camcorder, and which corresponds to each reproduction position in the DV tape; a time code storage means for storing time codes contained in data which are in the stream data recorded on the DV tape, and which respectively correspond to a dubbing start position and a dubbing end position in the DV tape commanded by the user (such time codes being hereafter referred to as "start time code" and "end time code", respectively), wherein the time code acquisition means acquires the start time code and the end time code when a user, using the operation means, commands the dubbing start position and the dubbing end position in the DV tape after the user, using the operation means, commands the DV camcorder to perform normal reproduction or fast-forward reproduction of the stream data in the DV tape in the DV camcorder; a program dubbing control means for controlling the DV camcorder to rewind the DV tape upon completion of the storage of the start time code and the end time code by the time code storage means when the user, using the operation means, commands program dubbing of stream data in the DV tape, and further for controlling the DV camcorder to reproduce and send stream data in a data area from data containing the start time code to data containing the end time code in the DV tape upon detection of ending of the rewinding of the DV tape, and still further for receiving the thus reproduced and sent stream data from the DV camcorder via the IEEE 1394 interface so as to allow the video recording means to record the thus received stream data on the recording medium; and a reset information storage means for storing information on data with a time code being reset (such information being hereafter referred to as "reset information").

When the time code acquisition means acquires the same time code as the end time code stored in the time code storage means during the reproduction in which the program dubbing control means controls the DV camcorder to reproduce and send the stream data in the data area from the data containing the start time code to the data containing the end time code in the DV tape, the program dubbing control means determines, on the basis of the reset information stored in the reset information storage means, whether or not the reproduction position, at the time of acquiring the same time code as the end time code, is the same as the dubbing end position commanded by the user using the operation means, and further stops the DV camcorder and the video recording means if the program dubbing control means determines that the then reproduction position is the same as the commanded dubbing end position.

The video recorder according to the present invention can perform secure dubbing even in the case where stream data recorded on the DV tape with time code being reset is to be subjected to program dubbing onto the recording medium of the video recorder, and where in addition to the data containing a time code corresponding to a dubbing end position commanded by the user (hereafter commanded dubbing end position), the DV tape has separate data storing the same time code. That is, even in such case, the video recorder of the present invention can accurately determine, in the middle of dubbing stream data recorded on and reproduced from the DV tape and on the basis of reset information stored in the reset information storage means, whether or not the position of data in the DV tape reproduced by the DV camcorder at the time of dubbing the data is the same as the commanded dubbing end position, thereby making it possible to securely dub, onto the recording medium of the video recorder, the stream data in the DV tape up to the commanded dubbing end position.

Preferably, when the time code acquisition means acquires the same time code as the start time code stored in the time code storage means during the rewinding in which the program dubbing control means controls the DV camcorder to rewind the DV tape, the program dubbing control means determines, on the basis of the reset information stored in the reset information storage means, whether or not the rewind position, at the time of acquiring the same time code as the start time code, is the same as the dubbing start position commanded by the user using the operation means, and further ends the rewinding if the program dubbing control means determines that the then rewind position is the same as the commanded dubbing start position.

The video recorder according to the preferred mode can perform secure rewinding even in the case where stream data recorded on the DV tape with time code being reset is to be subjected to program dubbing, and where in addition to the data containing a time code corresponding to a dubbing start position commanded by the user (hereafter commanded dubbing start position), the DV tape has separate data storing the same time code. That is, even in such case, the video recorder according to the preferred mode can accurately determine, on the basis of reset information stored in the reset information storage means, whether or not each rewind position in the DV tape (at the time of acquiring the same time code as the start time code) is the same as the commanded dubbing start position, thereby making it possible to securely rewind the DV tape up to the commanded dubbing start position.

The video recorder can be designed: so that the reset information storage means is a log table for storing the start time code and the end time code, and further for storing a time code which is contained in data in the DV tape in the DV camcorder and is reset (such a time code being hereafter referred to as "reset time code"), and still further for storing a time code which is contained in data immediately preceding the data containing the reset time code, the three time codes being acquired by the time code acquisition means during the normal reproduction or the fast-reproduction of the stream data in the DV tape; and so that when the time code acquisition means acquires the same time code as the end time code stored in the time code storage means during the reproduction in which the program dubbing control means controls the DV camcorder to reproduce and send the stream data in the data area from the data containing the start time code to the data containing the end time code in the DV tape, the program dubbing control means determines, on the basis of the three time codes stored in the log table, whether or not the reproduction position, at the time of acquiring the same time code as the end time code, is the same as the dubbing end position commanded by the user using the operation means.

Furthermore, the video recorder can be designed: so that the reset information storage means is a log table for storing the start time code and the end time code, and further for storing a time code which is contained in data in the DV tape in the DV camcorder and is reset (such a time code being hereafter referred to as "reset time code"), and still further for storing a time code which is contained in data immediately preceding the data containing the reset time code, the three time codes being acquired by the time code acquisition means during the normal reproduction or the fast-reproduction of the stream data in the DV tape; and so that when the time code acquisition means acquires the same time code as the start time code stored in the time code storage means during the rewinding in which the program dubbing control means controls the DV camcorder to rewind the DV tape, the program dubbing control means determines, on the basis of the three time codes stored in the log table, whether or not the rewind position, at the time of acquiring the same time code as the start time code, is the same as the dubbing start position commanded by the user using the operation means.

While the novel features of the present invention are set forth in the appended claims, the present invention will be better understood from the following detailed description taken in conjunction with the drawings.

BRIEF DESCRIPTION OF THE DRAWINGS

The present invention will be described hereinafter with reference to the annexed drawings. It is to be noted that all the drawings are shown for the purpose of illustrating the technical concept of the present invention or embodiments thereof, wherein:

FIG. 4 is a chart showing an exemplary combination of a commanded dubbing start position, 0 reset position and a commanded dubbing end position in the DV tape set in the DV camcorder;

FIG. 5 is a table showing an example of contents of a program data file in the HDD recorder, while FIG. 6 is a table showing an example of contents of a log table in the HDD recorder;

FIG. 7A is flow chart showing a rewinding/dubbing process in a step shown in the flow chart of FIG. 2, while

Each of FIG. 10

DESCRIPTION OF THE PREFERRED EMBODIMENTS

Embodiments of the present invention, as best mode for carrying out the invention, will be described hereinafter with reference to the drawings. The present invention relates to a video recorder to be connected to a DV (Digital Video) camcorder via an IEEE 1394 serial bus. The following embodiments describe examples in which the present invention is applied to an HDD (Hard Disk Drive) recorder. It is to be understood that the embodiments described herein are not intended as limiting, or encompassing the entire scope of, the invention.

Figure 1:
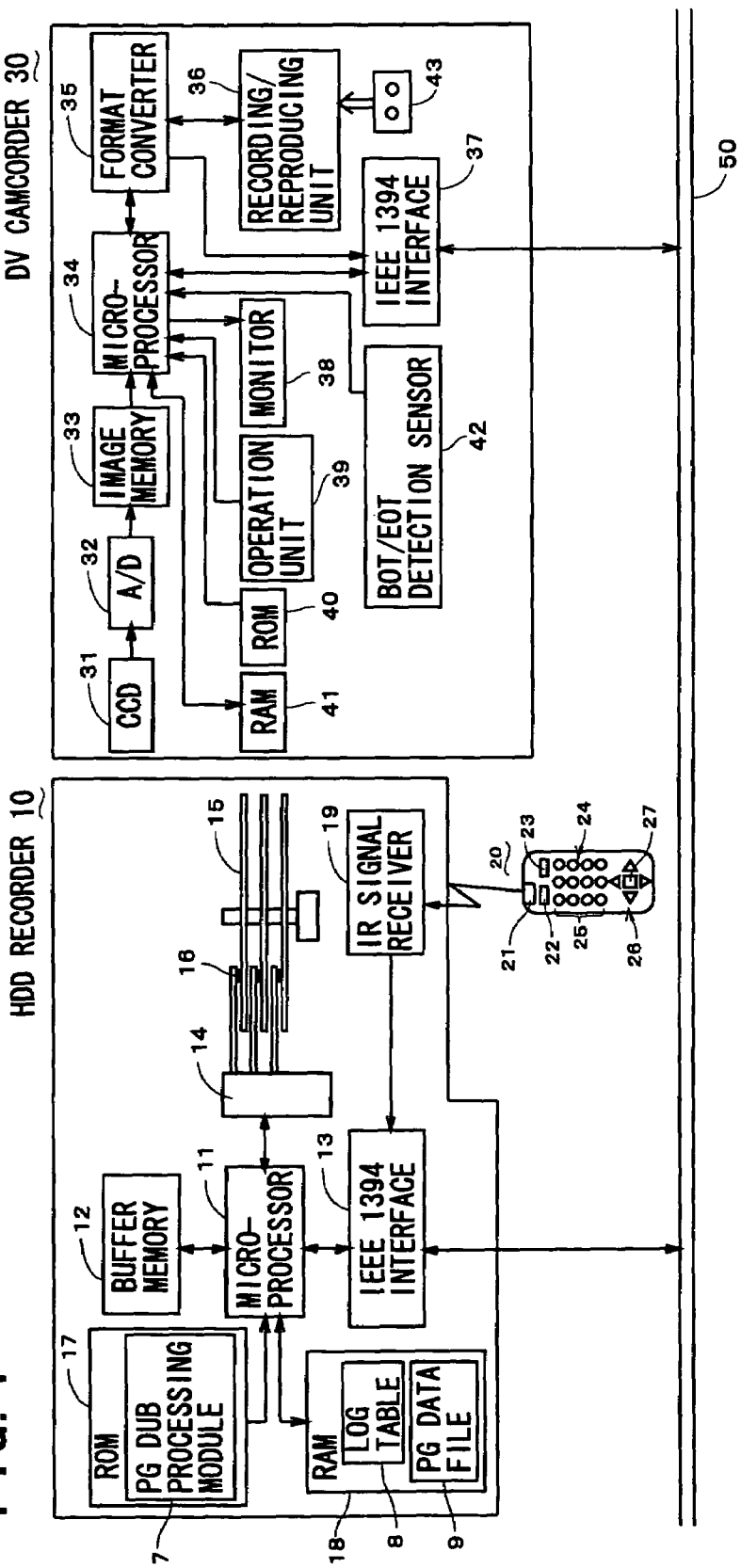
FIG. 1 is a schematic electrical block diagram of an HDD recorder according to a first embodiment of the present invention as well as a DV camcorder connected to the HDD recorder.

FIG. 1 shows a schematic electrical block diagram of an HDD recorder 10 according to a first embodiment of the present invention as well as a DV camcorder 30 to be connected to the HDD recorder 10 via an IEEE 1394 serial bus 50. The HDD recorder 10 is connected to the DV camcorder 30 via the IEEE 1394 serial bus 50 (hereafter referred to simply as "bus"), and is capable of recording stream data (photographed data), received from the DV camcorder 30, on hard disks 15. The HDD recorder 10 comprises a microprocessor 11 which serves as a control means in a broad sense for controlling various elements and units therein, and more specifically as a program dubbing control means, as will be evident from the following descriptions.

The HDD recorder 10 further comprises: a ROM (Read Only Memory) 17 storing control programs of the microprocessor 11; a RAM (Random Access Memory) 18 for storing various data; and an IEEE 1394 interface 13 (hereafter referred to simply as "interface") for sending and receiving data, such as control commands and stream data, to and from an external input/output device such as the DV camcorder 30 via the bus 50. The control programs stored in the ROM 17 include a PG (program) dubbing processing module (PG dub processing module) 7 composed of command codes describing a program dubbing process of dubbing stream data in a DV tape 43. Further, the RAM 18 stores a program data file 9 (PG data file; claimed "time code storage means") and a log table 8 (claimed "reset information storage means") which is a kind of working data generated by the PG dubbing processing module 7.

The HDD recorder 10 further comprises: multiple hard disks 15 as a recording medium; multiple magnetic heads 16 for recording and reading (reproducing) data on and from the hard disks 15; a head drive unit 14 for driving the magnetic heads 16; and a buffer memory 12 for temporarily storing recorded data or read (reproduced) data. The combination of the magnetic heads 16 and the head drive unit 14 corresponds to the claimed "video recording means" for recording, on the hard disks 15, stream data received from the DV camcorder 30 via the IEEE 1394 interface 13, while the combination of the microprocessor 11 and the interface 13 corresponds to the claimed "time code acquisition means" for acquiring a time code contained in data which is in stream data recorded on the DV tape 43 of the DV camcorder 30, and which corresponds to a reproduction position in the DV tape 43 as will be described later.

Furthermore, the HDD recorder 10 comprises an infrared signal receiving unit (IR signal receiver) 19 for receiving an infrared signal sent from a remote control 20 (claimed "operation means"). The remote control 20, which a user uses to command and operate the DV camcorder 30 and the HDD recorder 10 itself, has an infrared signal sending unit 21 and a key unit 24 having various keys. The keys of the key unit 24 include a power supply key 23, numeric input keys 25, cursor keys 26, a decision key 27, and additionally, a menu key 22 to command the microprocessor 11 to display, on a display unit (not shown), various menus including a menu to command program dubbing from the DV tape 43 in the DV camcorder 30 onto the hard disks 15 of the HDD recorder 10.

On the other hand, the DV camcorder 30 is a DV camera with a built-in VCR (Video Cassette Recorder), and comprises: an IEEE 1394 interface 37 (hereafter referred to simply as "interface") for sending and receiving control commands and stream data to and from e.g. the HDD recorder 10 via the bus 50; a CCD (Charge Coupled Device) 31 for outputting a recorded image (image of a photographed object) in the form of analog signal; an A/D (Analog-to-Digital) converter 32 for converting an analog signal output from the CCD 31 to a digital signal; an image memory 33 for temporarily storing image data sent from the A/D converter 32; a microprocessor 34 for subjecting the image data stored in the image memory 33 to various image processing; a format conversion circuit 35; and a recording/reproducing unit 36. The format conversion circuit (format converter) 35 converts the image data, subjected to the image processing by the microprocessor 34, into a data stream. The recording/reproducing unit 36 writes stream data, output from the format conversion circuit 35, onto the DV tape 43, and reproduces stream data (photographed data) recorded on the DV tape 43, and so on. The DV camcorder 30 further comprises: a liquid crystal monitor (monitor) 38 for displaying images sent from the microprocessor 34; an operation unit 39; a ROM 40 for storing various data such as control programs; a RAM 41 for storing various working data; and a BOT (beginning-of-tape)/EOT (end-of-tape) detection sensor 42 for detecting beginning and end of the DV tape 43.

Figure 2:
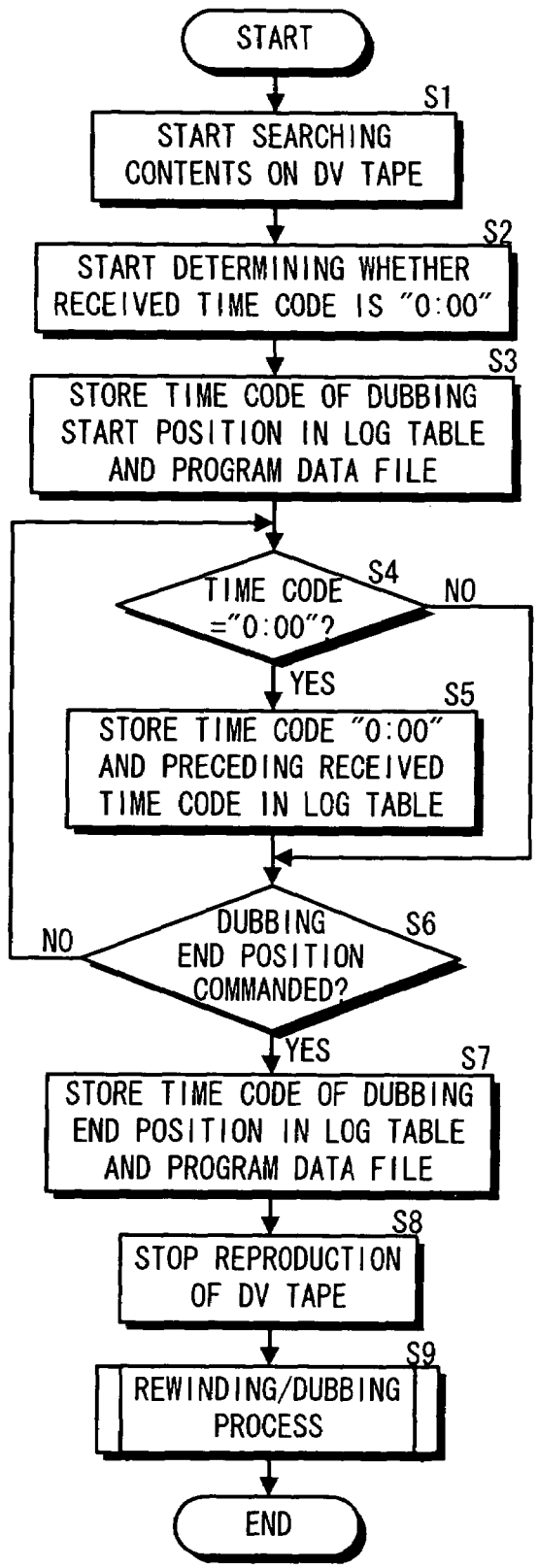
FIG. 2 is a flow chart showing a process of program dubbing in the HDD recorder.

Referring now to the flow chart of FIG. 2, the following describes a process of program dubbing in the HDD recorder 10 for dubbing from the DV tape 43 onto the hard disks 15. Note that the term "program dubbing" is used in the present embodiment to mean a process in which the microprocessor 11 of the HDD recorder 10 automatically dubs or records, onto the hard disks 15, stream data recorded in an area of the DV tape 43 from a dubbing (recording) start position to a dubbing (recording) end position in the DV tape 43. Here, the dubbing start position and the dubbing end position are those that a user commands or assigns while searching contents in stream data recorded on and reproduced from the DV tape 43.

When the user, using the remote control 20, commands the program dubbing, and further commands reproduction of the DV tape 43 in the DV camcorder 30 in order to search contents in stream data recorded on the DV tape 43, the microprocessor 11 of the HDD recorder 10 sends a reproduction command to the DV camcorder 30 so as to start searching the contents in the stream data recorded on the DV tape 43, and to start determining whether the time code in the stream data sent from the DV camcorder 30 is changed to "0:00" (i.e. reset to "0:00") (S1 and S2). When the user, using the remote control 20, commands a dubbing (recording) start position while viewing reproduced images that are displayed on the liquid crystal monitor 38 of the DV camcorder 30 during the reproduction of the stream data in normal mode or in fast-forward mode, the microprocessor 11 of the HDD recorder 10 stores, in the log table 8 and the program data file 9 in the RAM 18, a time code received from the DV camcorder 30 at the time the user commands the dubbing start position (S3).

Figure 3:
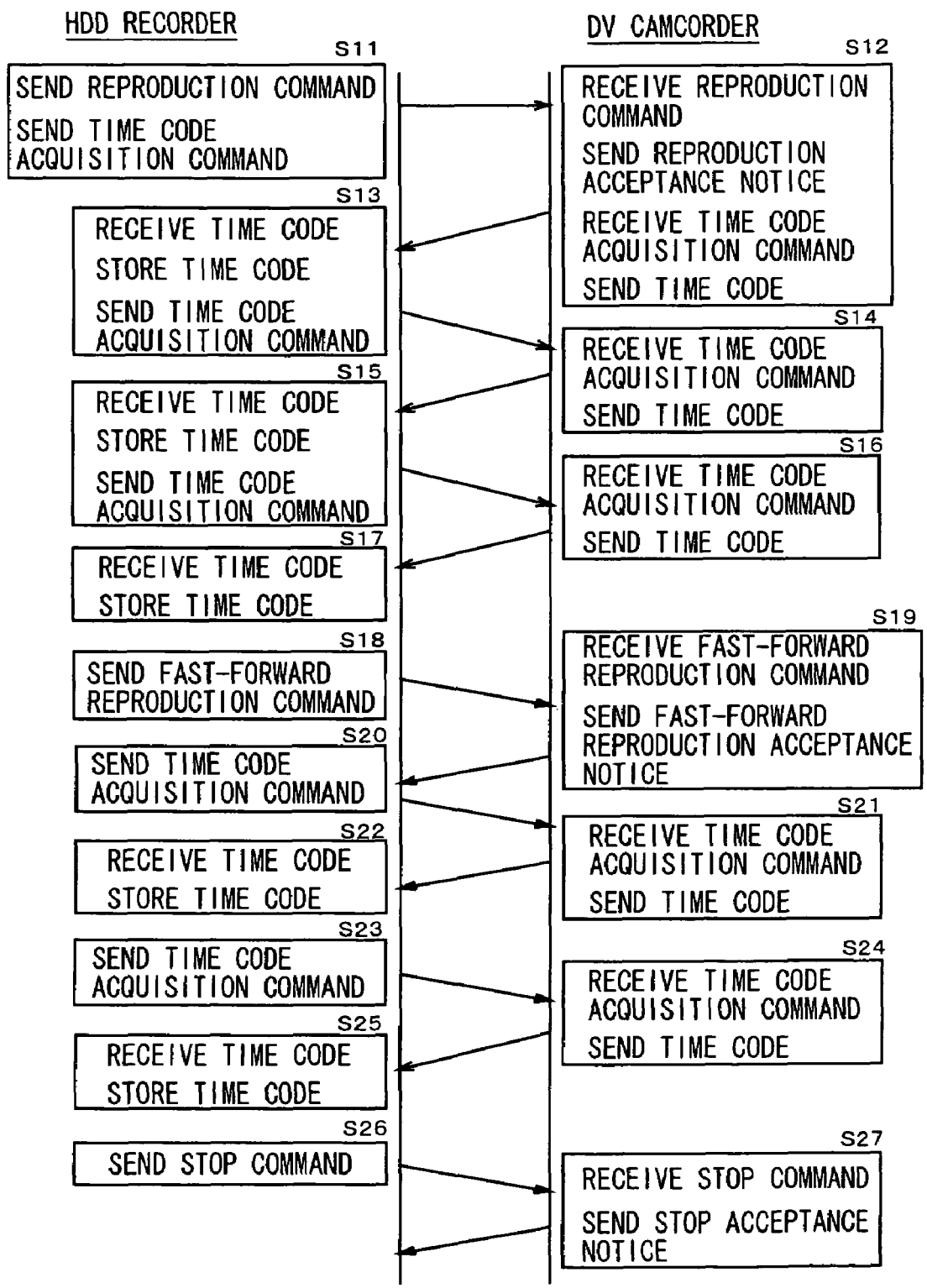
FIG. 3 is a timing chart showing a flow of commands between the HDD recorder and the DV camcorder when the HDD recorder is operated for search of contents reproduced from a DV tape in the DV camcorder.

While continuing the search of the reproduced contents, which has started in the step S1, the microprocessor 11 of the HDD recorder 10 continues to receive stream data from the DV camcorder 30, and sequentially stores, in a buffer (not shown) of the HDD recorder 10, time codes in the received stream data at the time of receiving them (more specifically, time codes each contained in each data whose reception from the DV camcorder 30 has been completed), as shown in steps S13, S15, S17, S22 and S25 in FIG. 3, which is a timing chart showing a flow of commands between the HDD recorder 10 and the DV camcorder 30 when the HDD recorder 10 is operated for the search of the reproduced contents. When the microprocessor 11 receives a time code "0:00" in the stream data sent from the DV camcorder 30, that is 0 (zero) reset (YES in S4), the microprocessor 11 stores this time code "0:00" and a preceding received time code (i.e. a time code immediately preceding the time code "0:00") in the log table 8 in the RAM 18 (S5).

Thereafter, when the user, using the remote control 20, commands a dubbing (recording) end position while viewing reproduced images that are displayed on the liquid crystal monitor 38 of the DV camcorder 30 (YES in S6), the microprocessor 11 of the HDD recorder 10 receives and stores, in the log table 8 and the program data file 9 in the RAM 18, a time code in stream data received from the DV camcorder 30 at the time the user commands the dubbing end position (S7). Subsequently, the microprocessor 11 sends a stop command to the DV camcorder 30 so as to stop the reproduction of the DV tape 43 (S8), and performs processes of rewinding the DV tape 43 and dubbing (recording) from the DV tape 43 onto the hard disks 15 (S9).

Figures 4, 5, 6:
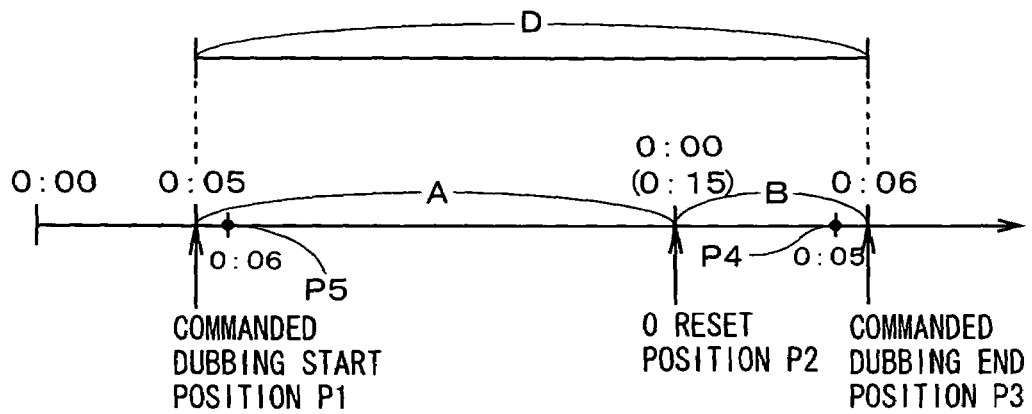

Referring now to FIG. 4 to FIG. 6, the following describes contents of the log table 8 and the program data file 9 after the dubbing (recording) start position and end position have been commanded as above. FIG. 4 is a chart showing an exemplary combination of a commanded dubbing start position, 0 reset position and a commanded dubbing end position in the DV tape 43 set in the DV camcorder 30. FIG. 5 is a table showing an example of contents of the program data file 9, while FIG. 6 is a table showing an example of contents of the log table 8.

For example, assume, as shown in FIG. 4, that at the time the user commands the dubbing start position, the reproduction position in the DV tape 43 (i.e. commanded dubbing start position P1 in FIG. 4) is a position corresponding to a time code "0:05". Here, the term "reproduction position" is used in the present specification to mean a position in the DV tape 43 at which an operating magnetic head 16 is positioned during reproduction. Further assume that a time code in data immediately following the position corresponding to a time code "0:15" in the DV tape 43 (i.e. in data at 0 reset position P2 in FIG. 4) is reset to 0. Furthermore, assume that the reproduction position in the DV tape 43 (i.e. commanded recording end position P3 in FIG. 4), at the time the user commands the dubbing end position, is a position corresponding to a time code "0:06".

In this case under these assumptions, the microprocessor 11 stores the two time codes in the program data file 9 as shown in FIG. 5, namely the time code ("0:05") corresponding to the commanded dubbing start position P1 and the time code ("0:06") corresponding to the commanded dubbing end position, as one scene with a scene number (the scene number being (1) in FIG. 5). Further, as shown in FIG. 6, the microprocessor 11 stores, in the first row of the log table 8, the time code ("0:05") corresponding to the commanded dubbing start position P1 and the time code ("0:15") immediately preceding the 0 reset position P2 in the DV tape 43, while storing, in the second row of the log table 8, the time code ("0:00") corresponding to the 0 reset position P2 and the time code ("0:06") corresponding to the commanded dubbing end position P3.

Referring now to the flow chart of FIG. 7A, the rewinding/dubbing (recording) process in the step S9 shown in the flow chart of FIG. 2 will be described. When the user finishes commanding the dubbing (recording) start position and end position, the microprocessor 11 of the HDD recorder 10 determines whether or not the log table 8 shown in FIG. 6 stores a time code "0:00" (S31). If the determination indicates that the log table 8 does not store a time code "0:00" (NO in S31), the microprocessor 11 performs normal program dubbing on the basis of two time codes stored in the program data file 9, namely the time code corresponding to the dubbing start position and the time code corresponding to the dubbing end position (S32).

For performing the normal program dubbing, the microprocessor 11 of the HDD recorder 10 continues to receive stream data, each containing a time code, from the DV camcorder 30, and determines whether or not each time code received from the DV camcorder 30 at the time of receiving the each time code (more specifically, time code contained in each data whose reception from the DV camcorder 30 has been completed) is the same as the time code corresponding to the dubbing start position or the dubbing end position as stored in the program data file 9. Thereby, the microprocessor 11 determines whether or not the rewind position or the reproduction position in the DV tape 43 at the time of receiving the each time code is the same as the dubbing start position or the dubbing end position which the user has actually commanded. Here, the term "rewind position" is used in the present specification to mean a position in the DV tape 43 at which an operating magnetic head 16 is positioned during rewinding.

Figure 7B:
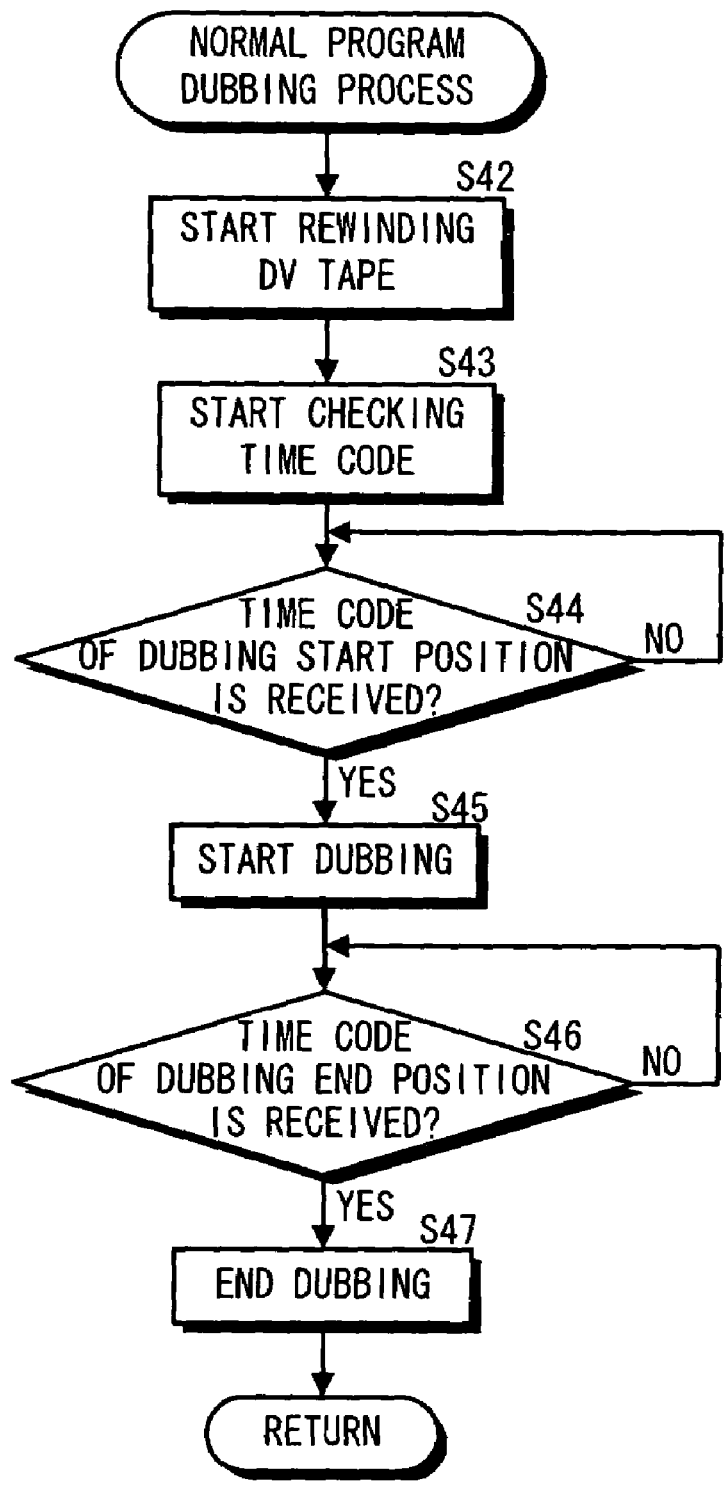
FIG. 7B is a flow chart showing a normal program dubbing process in a step in the flow chart of FIG. 7A.

The normal program dubbing process will be more specifically described below with reference to FIG. 7B. As shown in FIG. 7B, the microprocessor 11 of the HDD recorder 10 first sends a rewind command to the DV camcorder 30 so as to command the DV camcorder 30 to start rewinding the DV tape 43 (S42), and also sends a time code acquisition command to the DV camcorder 30 so as to acquire and start checking (determining) time codes sent from the DV camcorder 30 (S43). Subsequently, the microprocessor 11 determines whether or not each time code sent from the DV camcorder 30 is the same as the time code corresponding to the dubbing start position as stored in the program data file 9 (refer to FIG. 5).

When the microprocessor 11 receives the same time code as the time code corresponding to the dubbing start position (YES in S44), the microprocessor 11 sends a reproduction command to the DV camcorder 30 so as to start dubbing from the dubbing start position in the DV tape 43 (S45). Thereafter, the microprocessor 11 determines whether or not each time code sent from the DV camcorder 30 is the same as the time code corresponding to the dubbing end position as stored in the program data file 9 (refer to FIG. 5). When the microprocessor 11 receives the same time code as the time code corresponding to the dubbing end position (YES in S46), the microprocessor 11 sends a stop command to the DV camcorder 30 so as to command the DV camcorder 30 to stop reproduction of the DV tape 43 and to end dubbing (recording) onto the hard disks 15 (S47).

Referring back to the flow chart of FIG. 7A (S31); if the determination by the microprocessor 11 of the HDD recorder 10 indicates that the log table 8 stores a time code "0:00" (YES in S31), it means that the DV tape 43 having once been 0 reset in the past is to be used for dubbing, namely for reproducing and recording stream data therefrom and onto the hard disks 15. Thus, just by determining whether or not each time code received from the DV camcorder 30 at the time of receiving the each time code (more specifically, time code contained in each data whose reception from the DV camcorder 30 has been completed) is the same as the time code corresponding to the dubbing start position or the dubbing end position as stored in the program data file 9, it is not possible for the microprocessor 11 to determine whether or not the rewind position or the reproduction position in the DV tape 43 at the time of receiving the each time code is the same as the dubbing start position or the dubbing end position which the user has actually commanded.

So, if a time code received from the DV camcorder 30 is the same as the time code corresponding to the dubbing start position or the dubbing end position as stored in the program data file 9, the microprocessor 11 of the HDD recorder 10 determines, based on the information stored in the log table 8, whether or not the rewind position or the reproduction position in the DV tape 43 at the time of receiving the time code is the same as the dubbing start position or the dubbing end position which the user has actually commanded. This will be described in detail below.

Referring to FIG. 7A, if YES in S31, the microprocessor 11 of the HDD recorder 10 calculates the sum of the recording time from the dubbing start position (time point) to the dubbing end position (time point) (recording time of A+B in FIG. 4, which will hereafter be referred as to "total recording time"), based on the time code corresponding to the dubbing start position (in the period A in FIG. 4) and the dubbing end position (in the period B in FIG. 4) as stored in the log table 8 (S33). Then, the microprocessor 11 of the HDD recorder 10 sends a rewind command to the DV camcorder 30 so as to start rewinding the DV tape 43 (S34), and also sends a time code acquisition command to the DV camcorder 30 so as to acquire and start checking (determining) time codes sent from the DV camcorder 30 (S35). Subsequently, the microprocessor 11 determines whether or not each time code sent from the DV camcorder 30 is the same as the time code corresponding to the dubbing start position as stored in the program data file 9 (refer to FIG. 5).

When the microprocessor 11 receives the same time code as the time code corresponding to the dubbing start position (YES in S36), the microprocessor 11 determines whether or not the sum of recording time from the rewind start position (i.e. commanded dubbing end position P3 shown in FIG. 4) to the current rewind position (at the time the microprocessor 11 receives the same time code) is the same as the "total recording time" as calculated in the step S33. If they are not the same, the microprocessor 11 determines that the current rewind position is not the dubbing start position commanded by the user (i.e. commanded dubbing start position P1 shown in FIG. 4). On the other hand, if they are the same, the microprocessor 11 determines that the current rewind position is the dubbing start position commanded by the user (position P1) (S37), and sends a stop command to the DV camcorder 30 to stop rewinding the DV tape 43.

Next, the microprocessor 11 of the HDD recorder 10 sends a reproduction command to the DV camcorder 30 so as to start dubbing (recording) from the dubbing start position in the DV tape 43 (S38). Thereafter, the microprocessor 11 determines whether or not each time code sent from the DV camcorder 30 is the same as the time code corresponding to the dubbing end position as stored in the program data file 9 (refer to FIG. 5). When the microprocessor 11 receives the same time code as the time code corresponding to the dubbing end position (YES in S39), the microprocessor 11 determines whether or not the sum of recording time from the dubbing start position (i.e. commanded dubbing start position P1 shown in FIG. 4) to the current reproduction position (at the time the microprocessor 11 receives the same time code) is the same as the "total recording time" as calculated in the step S33.

If they are not the same, the microprocessor 11 determines that the current reproduction position is not the dubbing end position commanded by the user (i.e. commanded dubbing end position P3 shown in FIG. 4). On the other hand, if they are the same, the microprocessor 11 determines that the current reproduction position is the dubbing end position commanded by the user (position P3) (S40), and sends a stop command to the DV camcorder 30 to stop reproducing DV tape 43, and also to stop recording onto the hard disks 15 (S41). Thus, the stream data in the period D shown in FIG. 4 (i.e. sum of the period A and period B) is recorded on the hard disks 15.

Because of the adoption of the determination process to determine the dubbing start position as in the step S37, the microprocessor 11 of the HDD recorder 10 makes it possible to securely rewind the DV tape 43 up to the dubbing start position. This will be described more specifically below.

For example, assume that stream data recorded on the DV tape 43 with time code having been 0 reset as shown in FIG. 4 is to be subjected to program dubbing. Further assume that in addition to the data containing the time code ("0:05") corresponding to the dubbing start position commanded by the user (i.e. commanded dubbing start position P1 shown in FIG. 4), the DV tape 43 has separate data storing the same time code ("0:05") (i.e. data corresponding to the position P4 shown in FIG. 4). Even under these assumptions, the microprocessor 11 determines or can determine, because of the adoption of the above determination process, whether the sum of recording time from the rewind start position (commanded dubbing end position P3 shown in FIG. 4) to the current rewind position is the same as the "total recording time" as calculated in the step S33, whereby the microprocessor 11 can accurately determine whether or not the current rewind position is the same as the dubbing start position commanded by the user, thereby making it possible to securely rewind the DV tape 43 up to the dubbing start position.

Similarly, because of the adoption of the determination process to determine the dubbing end position as in the step S40, the microprocessor 11 of the HDD recorder 10 makes it possible to securely dub the stream data in the DV tape 43 up to the dubbing end position. This will be described more specifically below.

For example, assume that stream data recorded on the DV tape 43 with time code having been 0 reset as shown in FIG. 4 is to be subjected to program dubbing. Further assume that in addition to the data containing the time code ("0:06") corresponding to the dubbing end position commanded by the user (commanded dubbing end position P3 shown in FIG. 4), the DV tape 43 has separate data storing the same time code ("0:06") (data corresponding to the position P5 shown in FIG. 4). Even under these assumptions, the microprocessor 11 determines or can determine, because of the adoption of the above determination process, whether the sum of recording time from the dubbing start position (e.g. commanded dubbing start position P1 shown in FIG. 4) to the current reproduction position is the same as the "total recording time" as calculated in the step S33, whereby the microprocessor 11 can accurately determine whether or not the current reproduction position is the same as the dubbing end position commanded by the user, thereby making it possible to securely dub the stream data in the DV tape 43 up to the dubbing end position.

Figure 8:
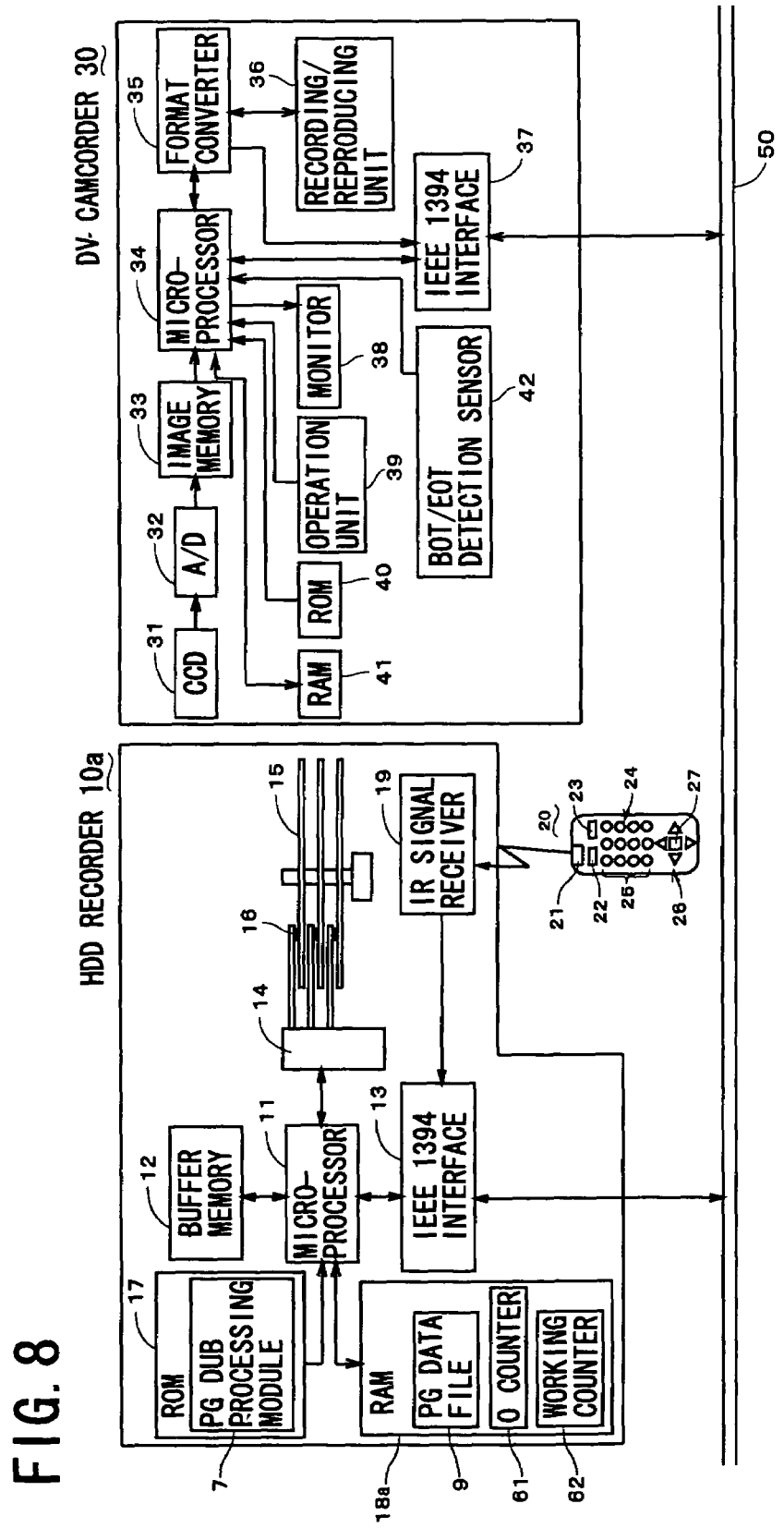
FIG. 8 is a schematic electrical block diagram of an HDD recorder according to a second embodiment of the present invention as well as a DV camcorder connected to the HDD recorder.

Hereinafter, an HDD recorder according to a second embodiment of the present invention will be described. FIG. 8 shows a schematic electrical block diagram of an HDD recorder 10a according to the second embodiment as well as a DV camcorder 30 to be connected to the HDD recorder 10a via an IEEE 1394 serial bus 50. In FIG. 1 and FIG. 8, respectively showing the first and the second embodiments, like elements are designated by like reference numerals. The HDD recorder 10a of the second embodiment is basically the same as the HDD recorder 10 of the first embodiment, except that the HDD recorder 10a of the second embodiment comprises a RAM 18a which does not store the log table 8, but stores a 0 (zero) counter 61 (corresponding to the claimed "reset information storage means") and a working counter 62. Using these counters 61 and 62, a microprocessor 11 of the HDD recorder 10a of the second embodiment accurately determines whether or not each rewind position and each reproduction position are the same as a dubbing start position and a dubbing end position commanded by a user, respectively. This will be described more specifically below with reference to FIG. 9 to FIG. 12.

Figure 9:
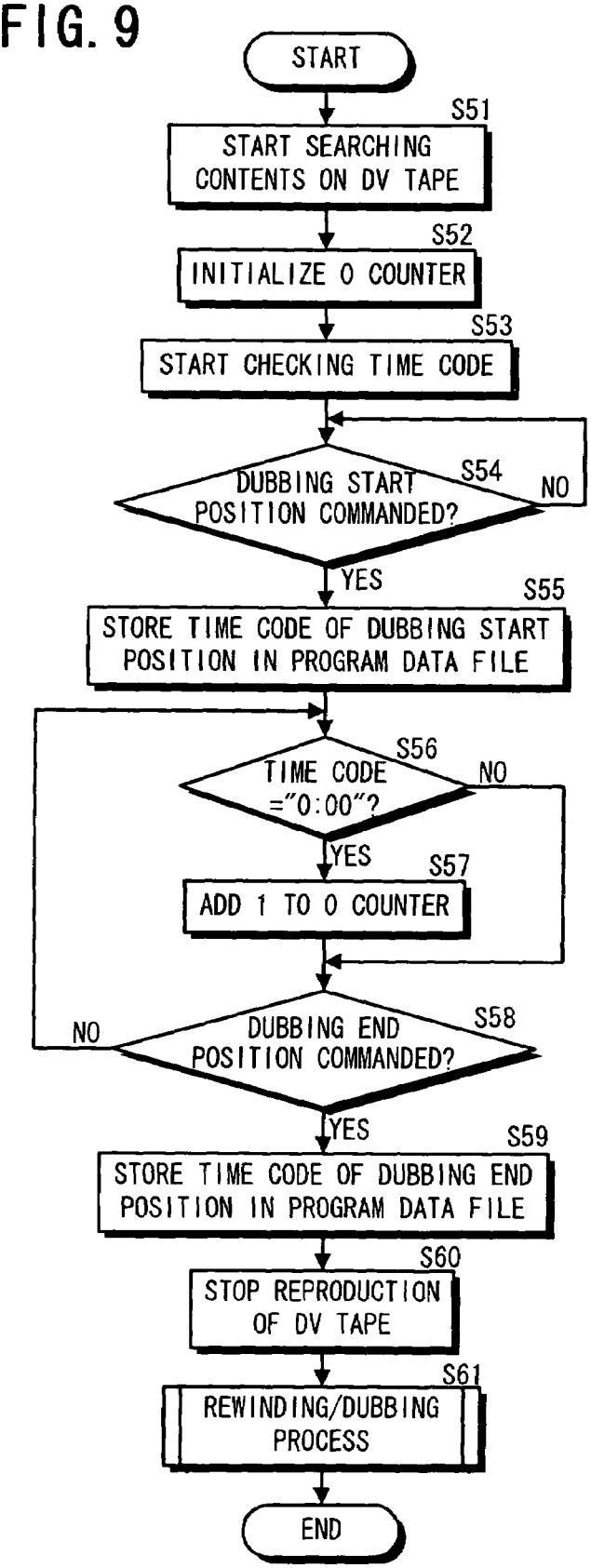
FIG. 9 is a flow chart showing a process of program dubbing in the HDD recorder.
Figure 10:
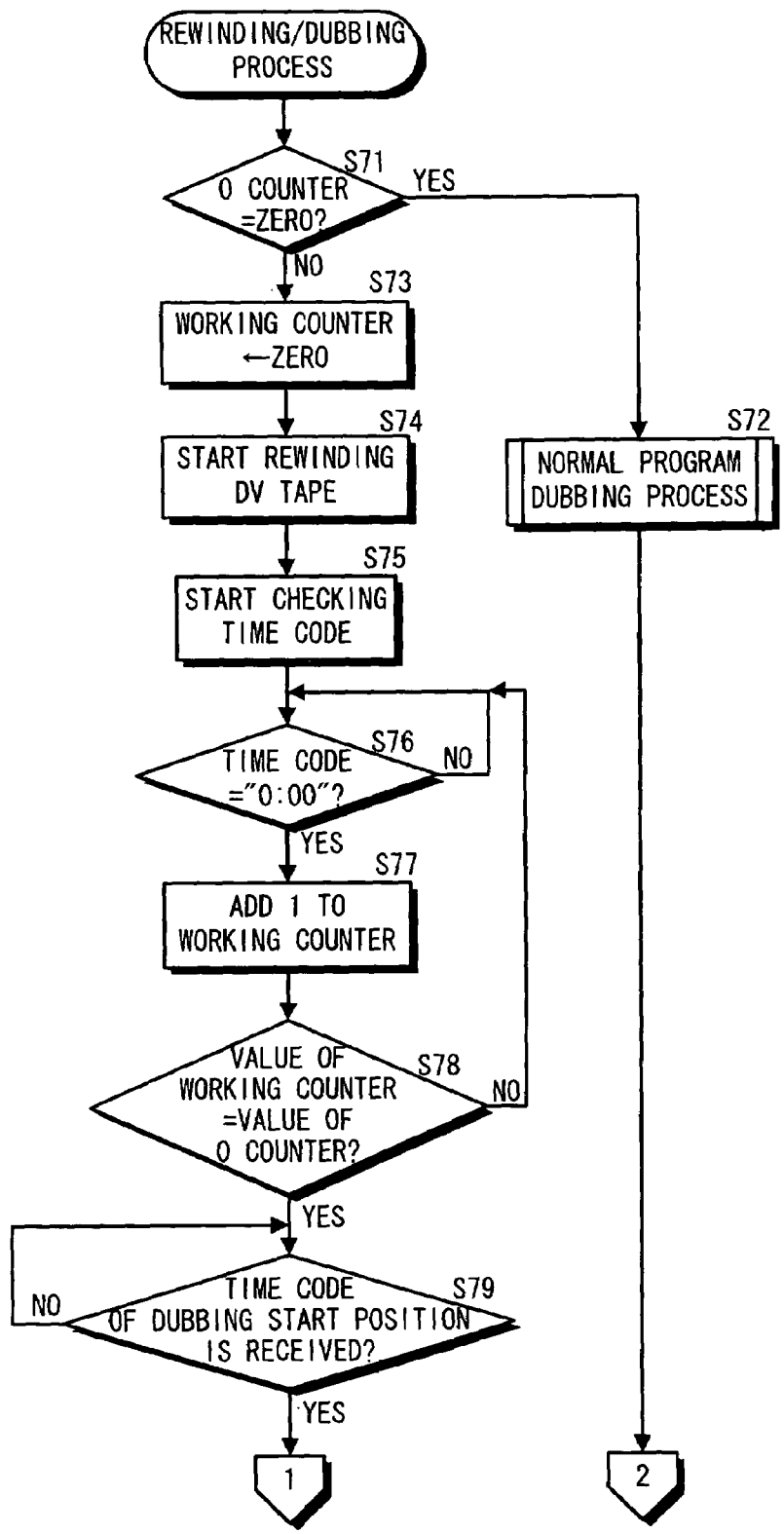

As shown in FIG. 9, which is a flow chart showing a process of program dubbing in the HDD recorder 10a, when searching contents of stream data recorded on a DV tape 43 (S51), the microprocessor 11 of the HDD recorder 10a according to the second embodiment detects and determines the number of data having been 0 reset (i.e. data each containing a time code "0:00") in a data area from the dubbing start position to the dubbing end position, and set the thus determined number of data in the 0 counter 61 (S52 to S58). Describing in another way, such number of data can be described as "the number of data each with a time code being 0 reset in the DV tape 43 in the DV camcorder 30". Then, as shown in FIG. 10, which is a flow chart showing a rewinding/dubbing process in the step S61 shown in the flow chart of FIG. 9, when rewinding the DV tape 43, the microprocessor 11 of the HDD recorder 10a starts rewinding the DV tape 43 from the dubbing end position (S74), and adds 1 (one) to the working counter 62 each time the microprocessor 11 detects data containing time code "0:00" (i.e. having been 0 reset) during the rewinding until the value of the working counter 62 becomes equal to the value of the 0 counter 61 (S73 to S78). After the value of the working counter 62 becomes equal to the value of the 0 counter 61, the microprocessor 11 checks and determines whether or not the microprocessor 11 receives, from the DV camcorder 30, the same time code as the time code corresponding to the dubbing start position as stored in the program data file 9 (refer to FIG. 5) (S79).

Because of the adoption of the determination process to determine the dubbing start position as described above, the microprocessor 11 of the HDD recorder 10a makes it possible to securely rewind the DV tape 43 up to the commanded dubbing start position. This will be described more specifically below.

Figure 12:
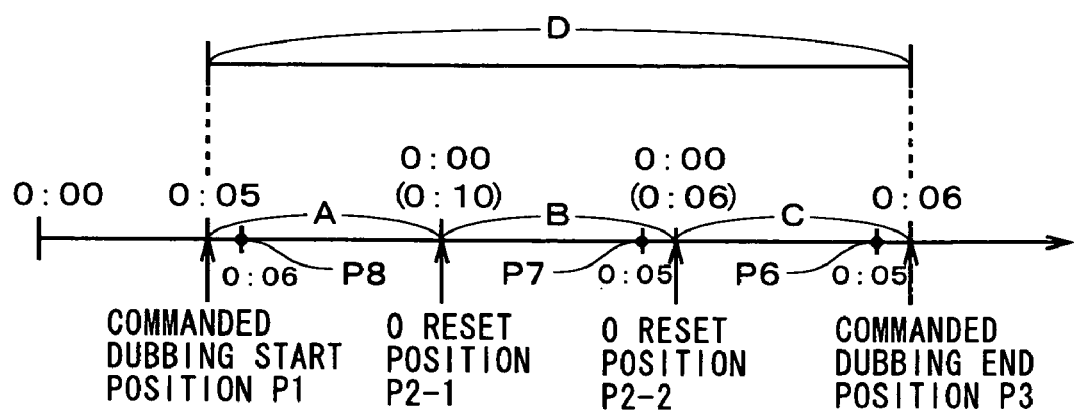
FIG. 12 is a chart showing an exemplary combination of a commanded dubbing start position, 0 reset position and a commanded dubbing end position in the DV tape set in the DV camcorder.
Figure 13:
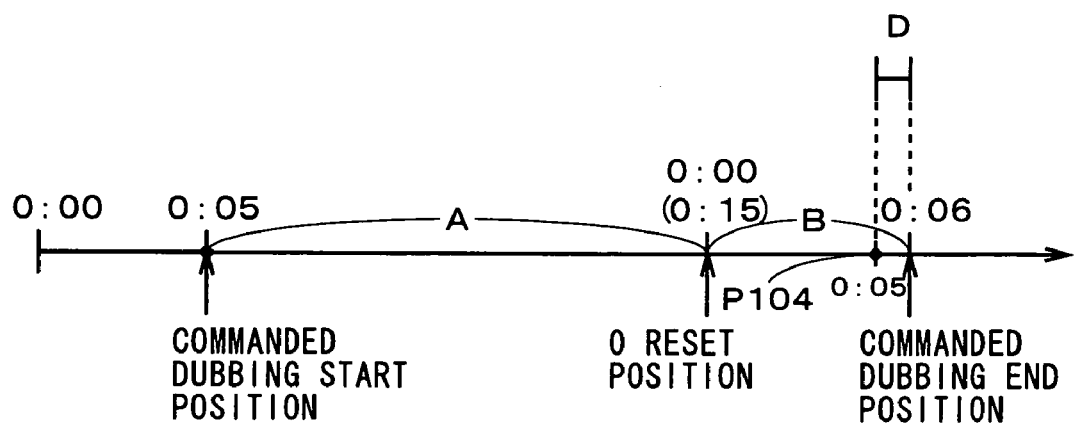
FIG. 13 is a chart showing an exemplary combination of a commanded dubbing start position, 0 reset position and a commanded dubbing end position in a DV tape set in a DV camcorder according to prior art.

For example, assume that stream data recorded on the DV tape 43 with time code having been 0 reset as shown in FIG. 12 is to be subjected to program dubbing, wherein FIG. 12 is a chart showing an exemplary combination of a commanded dubbing start position, 0 reset position and a commanded dubbing end position in the DV tape 43 set in the DV camcorder 30. Further assume that in addition to the data containing the time code ("0:05") corresponding to the dubbing start position commanded by the user (commanded dubbing start position P1 shown in FIG. 12), the DV tape 43 has separate data storing the same time code ("0:05") (data corresponding to the position P6 and P7 shown in FIG. 12). Even under these assumptions, the microprocessor 11 of the HDD recorder 10a determines or can determine, because of the adoption of the above determination process, whether or not the microprocessor 11 receives, from the DV camcorder 30 after the 0 reset positions P2-2 and P2-1, the same time code as the time code corresponding to the dubbing start position as stored in the program data file 9 (refer to FIG. 5). This makes it possible to securely rewind the DV tape 43 up to the commanded dubbing start position P1.

Note here that if in the step S71 the value of the 0 counter 61 is zero (NO in S71), the microprocessor 11 performs normal program dubbing process shown in FIG. 7B.

Figure 11:
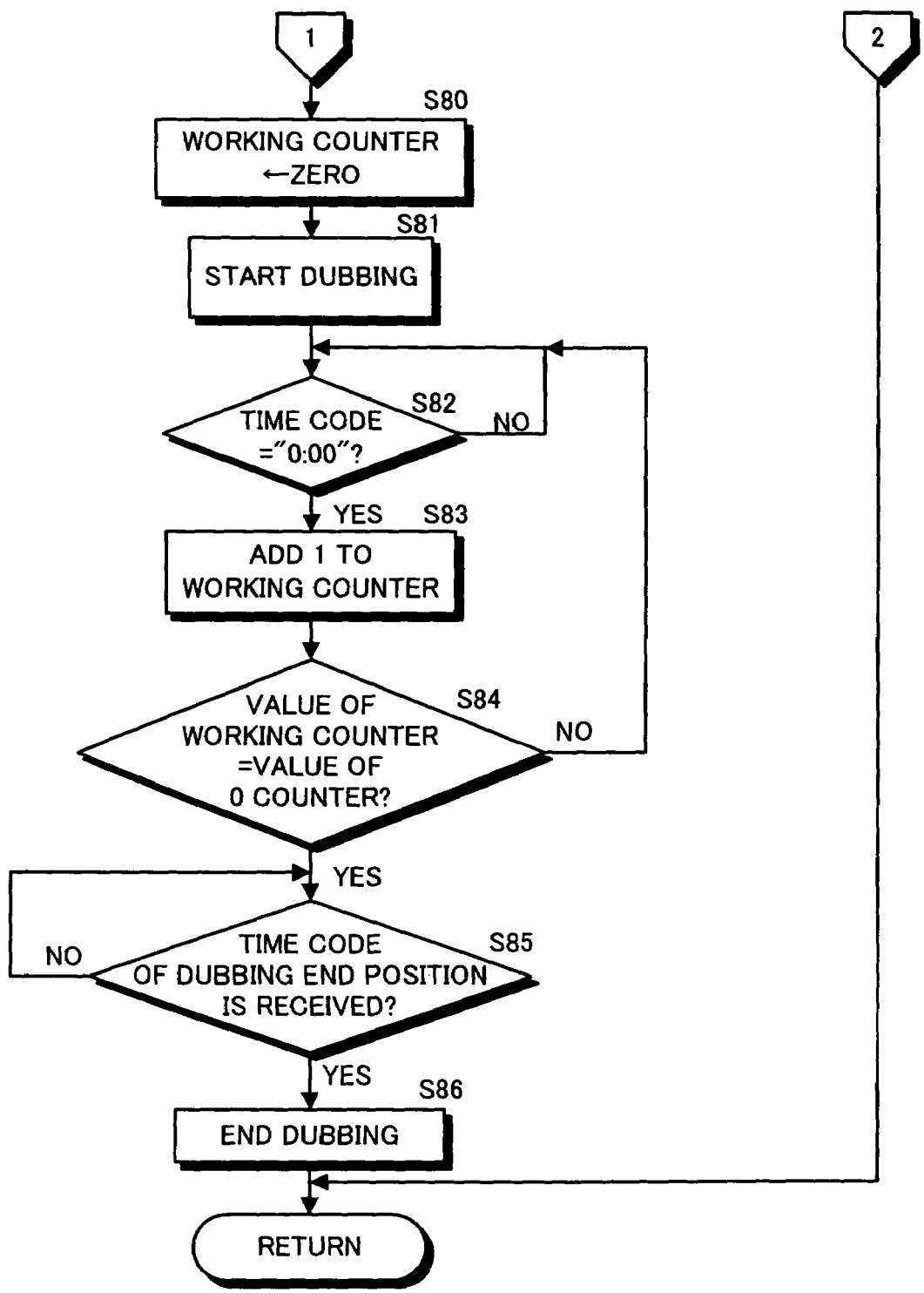
FIG. 11 is a flow chart showing a rewinding/dubbing process in a step shown in the flow chart of FIG. 9.

Similarly, as shown in FIG. 11, which is also a flow chart showing a rewinding/dubbing process in the step S61 shown in the flow chart of FIG. 9, when dubbing from the DV tape 43, the microprocessor 11 of the HDD recorder 10a starts dubbing (reproducing) stream data in the DV tape 43 from the dubbing start position commanded by the user (S81), and adds 1 (one) to the working counter 62 each time the microprocessor 11 detects data containing time code "0:00" (i.e. having been 0 reset) during the dubbing until the value of the working counter 62 becomes equal to the value of the 0 counter 61 (S80 to S84). After the value of the working counter 62 becomes equal to the value of the 0 counter 61, the microprocessor 11 checks and determines whether or not the microprocessor 11 receives, from the DV camcorder 30, the same time code as the time code corresponding to the dubbing end position as stored in the program data file 9 (refer to FIG. 5) (S85).

Because of the adoption of the determination process to determine the dubbing end position as described above, the microprocessor 11 of the HDD recorder 10*a* makes it possible to securely dub the DV tape 43 up to the commanded dubbing end position (i.e. reproduce it from the DV tape 43 and record it on the hard disks 15). This will be described more specifically below.

For example, assume that stream data recorded on the DV tape 43 with time code having been 0 reset as shown in FIG. 12 is to be subjected to program dubbing. Further assume that in addition to the data containing the time code ("0:06") corresponding to the dubbing end position commanded by the user (commanded dubbing end position P3 shown in FIG. 12), the DV tape 43 has separate data storing the same time code ("0:06") (data corresponding to the position P8, and data immediately preceding the 0 reset position P2-2 shown in FIG. 12). Even under these assumptions, the microprocessor 11 of the HDD recorder 10*a* determines or can determine, because of the adoption of the above determination process, whether the microprocessor 11 receives, from the DV camcorder 30 after the 0 reset position P2-2, the same time code as the time code corresponding to the dubbing end position as stored in the program data file 9 (refer to FIG. 5). This makes it possible to securely dub the DV tape 43 up to the commanded dubbing end position P3, i.e. securely reproduce stream data in the DV tape 43 up to the position P3 and record the thus reproduced data on the hard disks 15. Thus, the stream data in the period D shown in FIG. 12 (i.e. sum of the periods A, B and C) is recorded on the hard disks 15.

It is to be noted that the present invention is not limited to the above-described embodiments, and various modifications are possible. For example, the above embodiments show the case in which the present invention has been applied to an HDD recorder. However, the video recorder to which the present invention can be applied is not limited thereto. The video recorder can be e.g. a DVD recorder or a digital VCR. In addition, although the HDD recorder of the first embodiment calculates a "total recording time" by summing recording times on the basis of data stored in the log table 8 for the purpose of determining a dubbing start position or a dubbing end position actually commanded by a user, the purpose can be achieved without summing the recording times. For example, a method of tracking transition of a dubbing start position and a dubbing end position stored in the log table 8 can be employed to determine whether or not each rewind position or each reproduction position in the DV tape is the same as the dubbing start position or the dubbing end position actually commanded by the user.

The present invention has been described above using presently preferred embodiments, but such description should not be interpreted as limiting the present invention. Various modifications will become obvious, evident or apparent to those ordinarily skilled in the art, who have read the description. Accordingly, the appended claims should be interpreted to cover all modifications and alterations which fall within the spirit and scope of the present invention.

This application is based on Japanese patent application 2004-312124 filed Oct. 27, 2004, the contents of which are hereby incorporated by reference.

What is claimed is:

1. A video recorder to be connected to a DV (Digital Video) camcorder via an IEEE (Institute of Electrical & Electronics Engineers) 1394 serial bus, the video recorder comprising:
   an operation means for commanding and operating the DV camcorder and the video recorder itself;
   an IEEE 1394 interface for sending and receiving control commands and its response signal, and also sending and receiving stream data, to and from the DV camcorder;
   a video recording means for recording, on a recording medium, stream data received from the DV camcorder via the IEEE 1394 interface;
   a time code acquisition means for acquiring a time code contained in data which is in stream data recorded on a DV tape of the DV camcorder, and which corresponds to each reproduction position in the DV tape;
   a time code storage means for storing time codes contained in data which are in the stream data recorded on the DV tape, and which respectively correspond to a dubbing start position and a dubbing end position in the DV tape commanded by the user (such time codes being hereafter referred to as "start time code" and "end time code", respectively), wherein the time code acquisition means acquires the start time code and the end time code when a user, using the operation means, commands the dubbing start position and the dubbing end position in the DV tape after the user, using the operation means, commands the DV camcorder to perform normal reproduction or fast-forward reproduction of the stream data in the DV tape in the DV camcorder;
   a program dubbing control means for controlling the DV camcorder to rewind the DV tape upon completion of the storage of the start time code and the end time code by the time code storage means when the user, using the operation means, commands program dubbing of stream data in the DV tape, and further for controlling the DV camcorder to reproduce and send stream data in a data area from data containing the start time code to data containing the end time code in the DV tape upon detection of ending of the rewinding of the DV tape, and still further for receiving the thus reproduced and sent stream data from the DV camcorder via the IEEE 1394 interface so as to allow the video recording means to record the thus received stream data on the recording medium; and
   a reset information storage means for storing information on data with a time code being reset in the DV tape (such information being hereafter referred to as "reset information"),
   wherein when the time code acquisition means acquires the same time code as the end time code stored in the time code storage means during the reproduction in which the program dubbing control means controls the DV camcorder to reproduce and send the stream data in the data area from the data containing the start time code to the data containing the end time code in the DV tape, the program dubbing control means determines, on the basis of the reset information stored in the reset information storage means, whether or not the reproduction position, at the time of acquiring the same time code as the end time code, is the same as the dubbing end position commanded by the user using the operation means, and further stops the DV camcorder and the video recording means if the program dubbing control means determines that the then reproduction position is the same as the commanded dubbing end position.

2. The video recorder according to claim 1,
   wherein when the time code acquisition means acquires the same time code as the start time code stored in the time code storage means during the rewinding in which the program dubbing control means controls the DV camcorder to rewind the DV tape, the program dubbing control means determines, on the basis of the reset information stored in the reset information storage means, whether or not the rewind position, at the time of acquiring the same time code as the start time code, is the same as the dubbing start position commanded by the user using the operation means, and further ends the rewinding if the program dubbing control means determines that the then rewind position is the same as the commanded dubbing start position.

3. The video recorder according to claim 2,
wherein the reset information storage means is a log table for storing the start time code and the end time code, and further for storing a time code which is contained in data in the DV tape in the DV camcorder and is reset (such a time code being hereafter referred to as "reset time code"), and still further for storing a time code which is contained in data immediately preceding the data containing the reset time code, the three time codes being acquired by the time code acquisition means during the normal reproduction or the fast-reproduction of the stream data in the DV tape, and
wherein when the time code acquisition means acquires the same time code as the end time code stored in the time code storage means during the reproduction in which the program dubbing control means controls the DV camcorder to reproduce and send the stream data in the data area from the data containing the start time code to the data containing the end time code in the DV tape, the program dubbing control means determines, on the basis of the three time codes stored in the log table, whether or not the reproduction position, at the time of acquiring the same time code as the end time code, is the same as the dubbing end position commanded by the user using the operation means.

4. The video recorder according to claim 3,
wherein when the time code acquisition means acquires the same time code as the start time code stored in the time code storage means during the rewinding in which the program dubbing control means controls the DV camcorder to rewind the DV tape, the program dubbing control means determines, on the basis of the three time codes stored in the log table, whether or not the rewind position, at the time of acquiring the same time code as the start time code, is the same as the dubbing start position commanded by the user using the operation means.

5. The video recorder according to claim 2,
wherein the reset information storage means is a log table for storing the start time code and the end time code, and further for storing a time code which is contained in data in the DV tape in the DV camcorder and is reset (such a time code being hereafter referred to as "reset time code"), and still further for storing a time code which is contained in data immediately preceding the data containing the reset time code, the three time codes being acquired by the time code acquisition means during the normal reproduction or the fast-reproduction of the stream data in the DV tape, and
wherein when the time code acquisition means acquires the same time code as the start time code stored in the time code storage means during the rewinding in which the program dubbing control means controls the DV camcorder to rewind the DV tape, the program dubbing control means determines, on the basis of the three time codes stored in the log table, whether or not the rewind position, at the time of acquiring the same time code as the start time code, is the same as the dubbing start position commanded by the user using the operation means.

6. The video recorder according to claim 2,
wherein the reset information storage means stores the number of data each with a time code being reset in the DV tape in the DV camcorder, and
wherein when the time code acquisition means acquires the same time code as the start time code stored in the time code storage means during the rewinding in which the program dubbing control means controls the DV camcorder to rewind the DV tape, the program dubbing control means determines, on the basis of the number of data each with the time code being reset and each stored in the reset information storage means, whether or not the rewind position, at the time of acquiring the same time code as the start time code, is the same as the dubbing start position commanded by the user using the operation means.

7. The video recorder according to claim 1,
wherein the reset information storage means is a log table for storing the start time code and the end time code, and further for storing a time code which is contained in data in the DV tape in the DV camcorder and is reset (such a time code being hereafter referred to as "reset time code"), and still further for storing a time code which is contained in data immediately preceding the data containing the reset time code, the three time codes being acquired by the time code acquisition means during the normal reproduction or the fast-reproduction of the stream data in the DV tape, and
wherein when the time code acquisition means acquires the same time code as the end time code stored in the time code storage means during the reproduction in which the program dubbing control means controls the DV camcorder to reproduce and send the stream data in the data area from the data containing the start time code to the data containing the end time code in the DV tape, the program dubbing control means determines, on the basis of the three time codes stored in the log table, whether or not the reproduction position, at the time of acquiring the same time code as the end time code, is the same as the dubbing end position commanded by the user using the operation means.

8. The video recorder according to claim 1,
wherein the reset information storage means stores the number of data each with a time code being reset in the DV tape in the DV camcorder, and
wherein when the time code acquisition means acquires the same time code as the end time code stored in the time code storage means during the reproduction in which the program dubbing control means controls the DV camcorder to reproduce and send the stream data in the data area from the data containing the start time code to the data containing the end time code in the DV tape, the program dubbing control means determines, on the basis of the number of data each with the time code being reset and each stored in the reset information storage means, whether or not the reproduction position, at the time of acquiring the same time code as the end time code, is the same as the dubbing end position commanded by the user using the operation means.

* * * * *